(12) United States Patent
Hilliard et al.

(10) Patent No.: US 7,209,831 B2
(45) Date of Patent: Apr. 24, 2007

(54) GPS COLLISION AVOIDANCE APPARATUS

(75) Inventors: Donald P. Hilliard, Camarillo, CA (US); Glenda E. Hilliard, Camarillo, CA (US); Michael P. Hilliard, Camarillo, CA (US); Christina A. Hilliard, Camarillo, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 389 days.

(21) Appl. No.: 10/746,893

(22) Filed: Dec. 29, 2003

(65) Prior Publication Data

US 2005/0143918 A1 Jun. 30, 2005

(51) Int. Cl.
*G08G 1/16* (2006.01)
(52) U.S. Cl. ............... 701/301; 701/213; 340/436; 340/901; 340/903
(58) Field of Classification Search .......... 701/301, 701/213; 340/436, 573.1, 901, 903
See application file for complete search history.

(56) References Cited

U.S. PATENT DOCUMENTS

| | | | | |
|---|---|---|---|---|
| 6,021,374 A * | 2/2000 | Wood | ...................... | 701/301 |
| 6,345,233 B1 * | 2/2002 | Erick | ...................... | 701/301 |
| 6,370,475 B1 * | 4/2002 | Breed et al. | ............... | 701/301 |
| 6,433,691 B1 * | 8/2002 | Hilliard et al. | .......... | 340/573.1 |
| 6,748,325 B1 * | 6/2004 | Fujisaki | ...................... | 701/301 |
| 6,813,561 B2 * | 11/2004 | MacNeille et al. | ......... | 701/213 |

* cited by examiner

*Primary Examiner*—Thomas Black
*Assistant Examiner*—Marie A Weiskopf
(74) *Attorney, Agent, or Firm*—David S. Kalmbaugh

(57) ABSTRACT

A GPS collision avoidance apparatus which uses Global Positioning System (GPS) information and computer processing to determine the location of man made and natural occurring obstacles to allow a user to avoid a collision with these obstacles. The collision avoidance apparatus has a collision decision processor which analyzes position and motion dynamics data including a direction of motion, a velocity and an acceleration for a user utilizing collision avoidance apparatus to determine whether a collision will occur and then to provide protection for the user in the event a collision is likely to occur.

15 Claims, 2 Drawing Sheets

GPS COLLISION AVOIDANCE APPARATUS

BACKGROUND OF THE INVENTION

1. Field of the Invention

The present invention relates generally to collision avoidance apparatus and systems. More specifically, the present invention relates to an apparatus for collision avoidance which uses Global Positioning System (GPS) information and computer processing to determine the location of man made and natural occurring obstacles to allow a user to avoid a collision with these obstacles.

2. Description of the Prior Art

GPS navigation systems utilize signals generated by and received from Earth's orbiting satellites to calculate a spatial position of an object in longitude, latitude and elevation relative to the earth's surface. The advances in GPS technology in recent years have produced high precision navigation systems with very fine accuracies in position definition of an object, normally within a few centimeters of the object's actual location.

Presently, commercially available GPS navigation units or devices display position information relative to a digital memory map on a local crystal display. For example, rental car companies are providing this technology in automobiles. These companies rent to travelers who are unfamiliar with the local area and need to travel to a particular destination. However, these GPS navigation devices are limited to navigation only and do not provide warning or avoidance information and protection from collision with an object in the path of a user.

Accordingly, there is a need for a GPS based navigation device which has the capability of identifying objects in the path of a user and providing the user with sufficient advanced warning to avoid a collision with an object in the user's path.

SUMMARY OF THE INVENTION

The GPS collision avoidance apparatus comprising the present invention overcomes some of the disadvantages of the past including those mentioned above in that it comprises a relatively simple yet highly effective collision warning and protection apparatus for protecting a user when the user is about to collide with an obstacle in the path of the user. Further, the GPS collision avoidance apparatus also provides a warning when obstacles are in the path of the user allowing the user to take evasive action to avoid the obstacles.

The collision avoidance apparatus includes a GPS processor and antenna for receiving and then processing GPS data from an external source. The GPS processor processes the GPS data continuously calculating the current position for the apparatus including its latitude, longitude and elevation relative to the earth's surface. The collision avoidance apparatus has a motion dynamics processor which receives the current position information from the GPS processor and a clock signal from a clock. The motion dynamics processor processes this information calculating the motion dynamics for the collision avoidance apparatus including its direction of motion, velocity and acceleration.

The collision avoidance apparatus also has a collision decision processor which includes an input for receiving and then processing the current position data and the motion dynamics data to determine the probability of a collision between a user wearing the collision avoidance apparatus, for example a skier, and an obstacle in the path of the user such as a tree. Data indicating the obstacles in the path of the user is provided by a stored obstacle locations device and is processed by the collision decision apparatus in making its determination as to the probability of a collision between the user and the obstacle. A warning signal provided by the collision decision apparatus indicates to the user that an obstacle is in the path of the user and that the user needs to take evasive action to avoid the obstacle. A protection signal provided by the collision decision apparatus indicates that a collision with an obstacle will occur and a protection is then activated to protect the user of the collision avoidance apparatus.

DETAILED DESCRIPTION OF A PREFERRED EMBODIMENT

Figure 1:
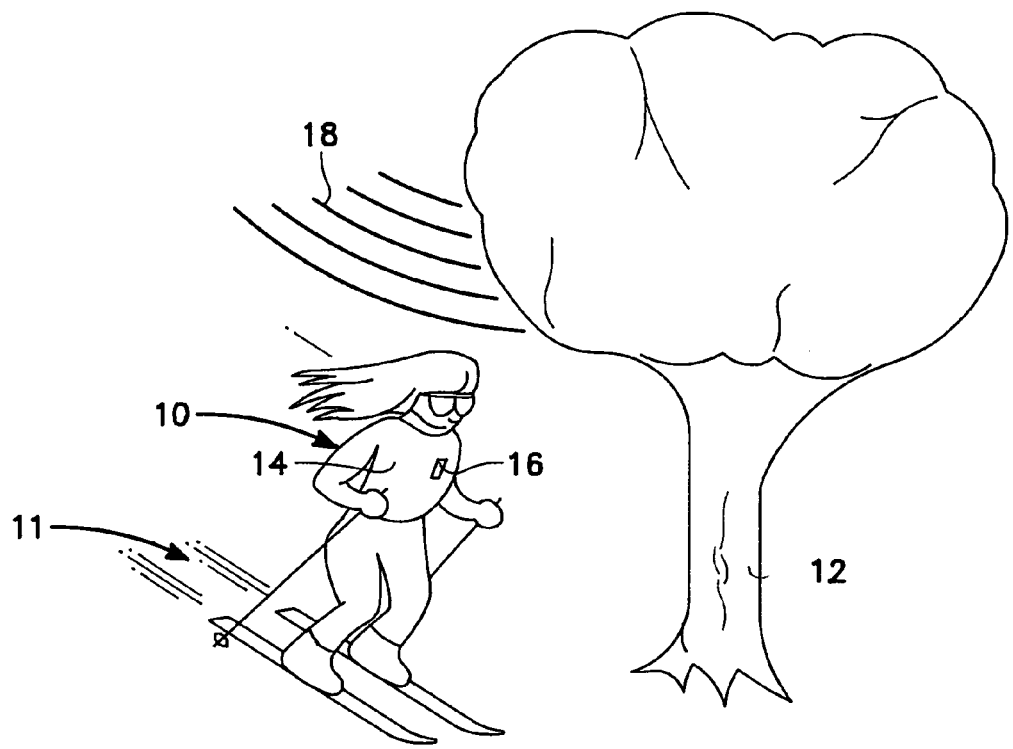
FIG. 1 illustrates a skier using the GPS collision avoidance apparatus which constitutes the present invention.
Figure 2:
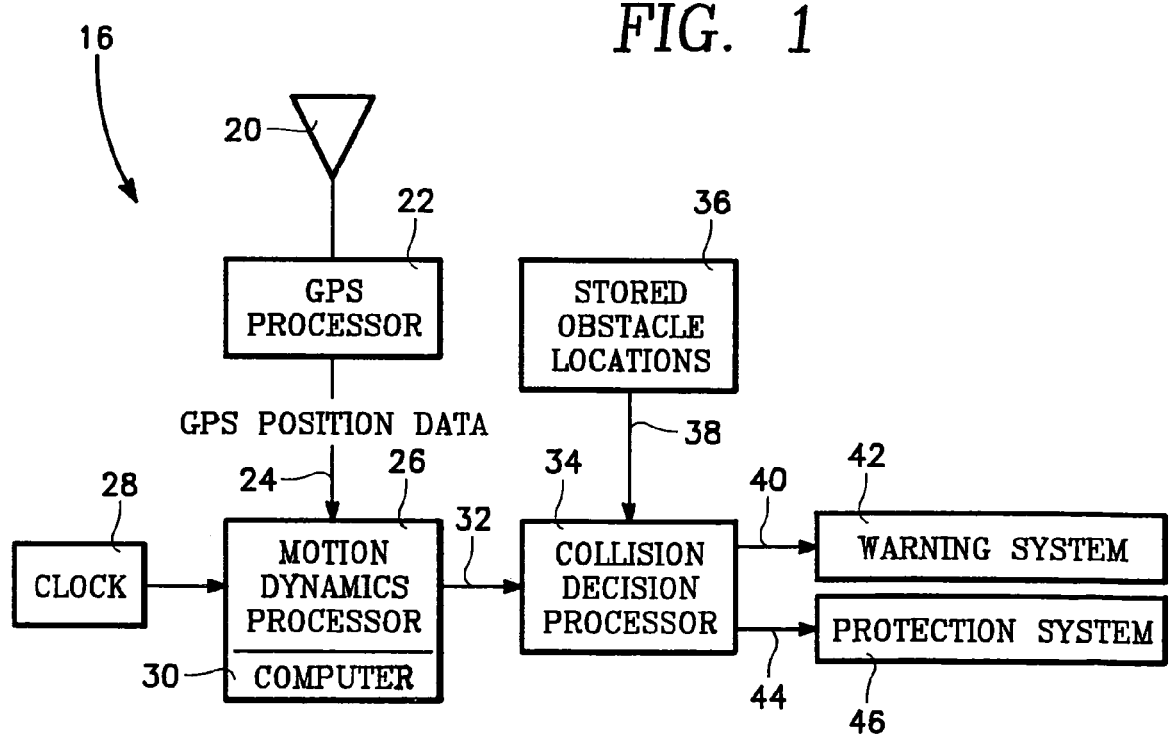
FIG. 2 illustrates an electrical schematic of the electrical components for the GPS collision avoidance apparatus of FIG. 1.

Referring to FIGS. 1 and 2, there is shown a skier 10 traveling along a downhill path 11 in proximity to a tree 12 which the skier 10 would like to avoid in order to prevent serious bodily harm which will likely be fatal. Skier 10 is wearing a ski jacket 14 as depicted FIG. 1. The lapel of ski jacket 14 includes the electrical components of the GPS collision avoidance apparatus 16 which are shown in FIG. 2.

GPS collision avoidance apparatus 16 has a GPS receiving antenna 20, such as a microstrip antenna, mounted on the lapel of ski jacket 14. Antenna 20 continuously receives radio frequency (RF) carrier signals 18 containing GPS data from satellites which generate the GPS data. The antenna 20 then provides RF equivalent electrical signals containing the GPS data to a GPS processor 22. GPS processor 22 which processes the GPS data continuously calculates the current position for apparatus 16 including its latitude, longitude and elevation relative to the earth's surface. The GPS processor 22 then provides the current position data via a signal path 24 to a motion dynamics processor 26. Signal path 24 connects the output of GPS processor 22 to the data input of motion dynamics processor 26. The clock signal output of an electronic clock 28 is connected to the clock signal input of motion dynamics processor 26. Electronic clock 28 provides a clock signal which includes time data to motion dynamics processor 26 via the clock signal input for motion dynamics processor 26.

Motion dynamics processor 26 includes computer processor circuitry 30 and computer software for performing calculations on the position data provided by GPS processor 22 and the time data provided by clock 28 to derive position and motion dynamics data for collision avoidance apparatus 16. It should be understood that the time data from clock 28 may also be provided by GPS processor 22 in which case the clock 28 is unnecessary. In the alternative, clock 28 may be used as a reference or backup clock.

This position and motion dynamics data includes a direction of motion, a velocity and an acceleration for collision avoidance apparatus 16 and the skier 10 utilizing collision avoidance apparatus 16.

Motion dynamics processor 26 continuously sends position and motion dynamics data via an electronic signal path 32 to a collision decision processor 34. Electronic signal path 32 connects processor 26 to processor 34. Also connected to collision decision processor 34 is a stored obstacle locations device 36. Stored obstacle locations device 36 includes digital memory (e.g. EEPROM (electrically erasable programmable read-only memory)), for storing the locations of stationary obstacles, such as tree 12, which are in the path 11 of skier 10. Location data for these stationary objects is continuously provided to collision decision processor 34 via electronic signal path 38 as skier 10 travels along downhill path 11.

Collision decision processor 34 continuously compares location data received from device 36 with the position, direction of motion, velocity and acceleration data for skier 10 provided by motion dynamics processor 26. Collision decision processor 34 then determines the distance between the skier 10 and calculates the probability of a collision between skier 10 and a stationary obstacle such as tree 12. The processing algorithms utilized by collision decision processor 34 include conventional guidance calculations, such as a Kalman filtering to provide for extremely accurate calculations as to the probability of a collision between the skier 10 and tree 12. When collision decision processor 34 determines that there is an impending collision, processor 34 sends a warning signal via an electronic signal path 40 to a collision warning system 42. Collision warning system 42 which is audio, visual and/or tactile, advises skier 10 of an impending collision allowing the skier 10 to take evasive action. When collision decision processor 34 calculates that there is insufficient time (e.g. two to ten seconds) to avert a collision, a protection activation signal is sent via an electronic signal path 44 to a collision protection system 46 designed to prevent serious bodily harm or even death to the skier 10.

Protection system 46 generally includes protection devices such as air bags, direct thrusters, braking systems and the like. One protection system which work well with the GPS collision avoidance apparatus comprising the present invention is U.S. Pat. No. 6,433,691, entitled "Personal Collision Warning and Protection System" which issued Aug. 13, 2002 to Donald H. Hilliard et al, the inventors of the present invention. U.S. Pat. No. 6,433,691 discloses an automatic protection system which identifies and responds to obstacles in the path of a user, such as skier, providing protection to the user when the system of U.S. Pat. No. 6,433,691 determines that a collision between the obstacle and the user will occur. The protection is in the form of an air bag located on a front portion of the jacket worn by the user. The air bag is inflated by an activation signal generated by the automatic protection system whenever a collision is eminent and there is a likely hood of severe bodily harm to the user.

At this time it should be noted that apparatus 16 is constructed using state of the art microprocessor chip technology and digital electronics technology that allows for small implementation that can easily be carried by an individual such as skier 10 who is wearing ski jacket 14, which has the electronics for GPS collision avoidance apparatus 16 (depicted in FIG. 2) imbedded therein. The electronics technology of collision avoidance apparatus 16 could also be mounted in a automobile to protect the driver and passengers of the automobile in the event that a collision is likely to occur with an obstacle in the path of the automobile.

Figure 3:
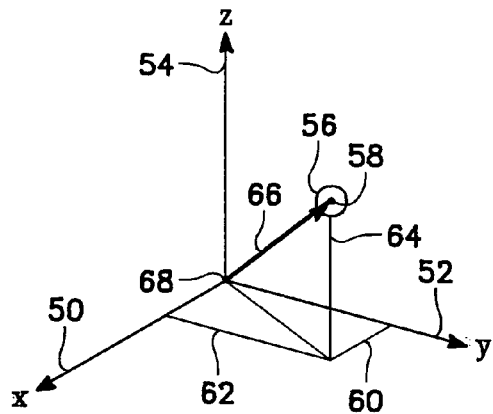
FIGS. 3–6 depict a method by which the direction of motion, the velocity and the acceleration are calculated for an individual using the GPS collision avoidance apparatus.

An example of the calculations performed by motion dynamics processor 26 and the computer processor circuitry 30 for processor 26 is best illustrated by FIGS. 3–6. Referring to FIG. 3, there is shown a Cartesian coordinate system with a coordinate axis x identified by the reference numeral 50, a coordinate axis y identified by the reference numeral 52 and a coordinate axis z identified by the reference numeral 54. These axis are representative of the three dimensional coordinates given by a GPS system where the X-axis 50, the y-axis 52 and the z-axis 54 represent respectively latitude, longitude and elevation. The spatial position of an object 56, such as skier 10 is shown at a position $P_1$ identified by the reference numeral 58, that is defined by coordinates $x_1$ (reference numeral 60), $y_1$ (reference numeral 62) and $z_1$ (reference numeral 64). Object 56 has a position vector $P_1$ (reference numeral 66) that begins at the coordinate system origin 68 and ends at point 58. Position vector $P_1$ is defined by the following vector equation:

$$P_1 = x_1 i + y_1 j + z_1 k \tag{1}$$

where i, j and k are the unit vectors in the x, y and z directions respectively.

As object 56 moves through space its trajectory is described by a sequence of position points to specific instances of time. Each position point has a corresponding position vector that begins at origin 68 and ends at the position point.

Figure 4:
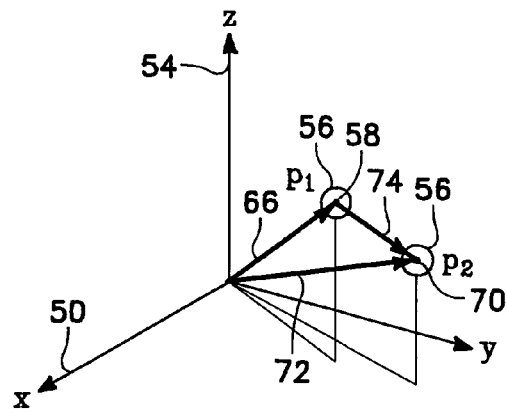

Referring to FIG. 4, object 56 is shown moving from $p_1$ (position 58) to a point $p_2$ identified by the reference numeral 70. The second position 70 has corresponding coordinates $x_2$, $y_2$ and $z_2$ and a new position vector $P_2$ identified by the reference numeral 72. The difference between $P_2$ and $P_1$ results in a new vector $\Delta P_{12}$ identified by the reference numeral 74 that is a direction vector from position 58 to position 70. The equation for calculating direction vector 74 is given by:

$$\Delta P_{12} = P_2 - P_1 = (x_2 - x_1)i + (y_2 - y_1)j + (z_2 - z_1)k \tag{2}$$

Position points 58 and 70 represent two position points for object 56 that are currently being sampled by GPS processor 22. The corresponding sampling times taken by GPS processor 22 for position points 58 and 70 are $t_1$ and $t_2$ respectively. The time interval between samples is given by $\Delta t = t_2 - t_1$. The average velocity vector $V_{12}$ for object 56 between position points 58 and 70 is calculated by dividing the direction vector 74 ($\Delta P_{12}$), given by equation 2 by the time interval $\Delta t$ resulting in the following expression:

$$\frac{\Delta P_{12}}{\Delta t} = V_{12} = \frac{(x_2 - x_1)}{\Delta t}i + \frac{(y_2 - y_1)}{\Delta t}j + \frac{(z_2 - z_1)}{\Delta t}k \tag{3}$$

Equation three can be put into more simplified form by substituting the following variables:

$v_{12x} = (x_2 - x_1)/\Delta t$
$v_{12y} = (y_2 - y_1)/\Delta t$
$v_{12z} = (z_2 - z_1)/\Delta t$ Each of these terms represents the speed of object 56 in the x, y and z directions, respectively. With these variable substitutions, equation (3) can be rewritten as:

$$V_{12} = v_{12x} i + v_{12y} j + v_{12z} k \tag{4}$$

The average velocity or speed of object 56 during its travel between position points 58 and 70 during the time interval Δt is determined by taking the square root of the sum of the squares of each component in equation 4:

$$|V_{12}| = \sqrt{v_{12x}^2 + v_{12y}^2 + v_{12z}^2} \quad (5)$$

This equation defines the speed in the direction of travel/motion of object 56 between points 58 and 70.

Figure 5:
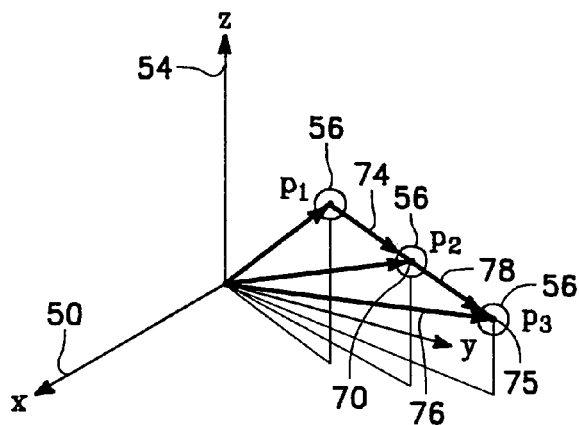

Referring to FIGS. 4 and 5, to calculate the acceleration of object 56, the difference in velocities for object 58 at two consecutive intervals is divided by the time to travel between the midpoints of the intervals. The midpoint time interval is Δt if the position samples are collected at consistent time intervals. As shown in FIG. 4, the first interval is shown between position point's 58 and 70 (points $p_1$ and $p_2$). There is shown in FIG. 5 a second interval between position points 70 and 75 (points $p_2$ and $p_3$). Position point 75 has the associated coordinates $x_3$, $y_3$ and $z_3$. Position point 75 has a position vector 76 and a direction vector 78 ($\Delta P_{23}$) which is illustrated in FIG. 5 as being between position points 70 and 75. The direction vector 78 has an associated average velocity, $V_{23}$, for the second interval depicted in FIG. 5. The acceleration $A_{12}$ of object 56 between the first and second intervals is given by the following equation:

$$A_{12} = \frac{V_{23} - V_{12}}{\Delta t} = \frac{v_{23x} - v_{12x}}{\Delta t}i + \frac{v_{23y} - v_{12y}}{\Delta t}j + \frac{v_{23z} - v_{12z}}{\Delta t}k \quad (6)$$

The magnitude for the acceleration of object 56 is calculated by taking the square root of the sum of the squares of each component of equation 6, in a manner similar to the calculation of the magnitude of the speed of object 56 as calculated using equation 5.

The position information from GPS processor 22, the time information from clock 28, and the motion dynamics information from motion dynamics processor 26 are continuously provided to collision decision processor 34 via electronic signal path 32. Collision decision processor 34 compares this position, time and motion dynamics information to the digital information relating to obstacle locations in the path of object 56 stored in obstacle locations device 36. This analysis performed by collision decision processor 34 is on a continuous basis with real time analysis and information being provided to skier 10 to protect skier 10.

Figure 6:
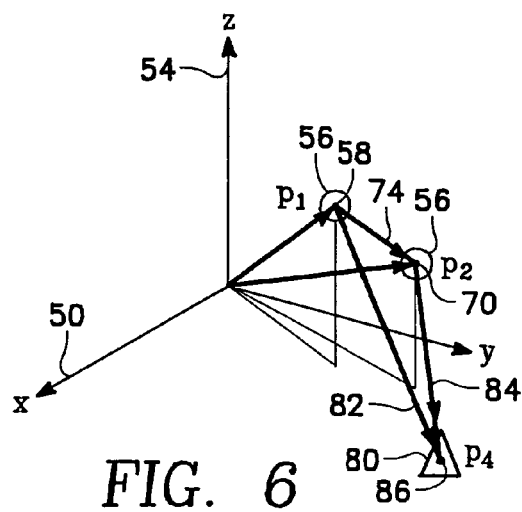

Referring to FIGS. 3, 4, 5 and 6, the motion of object 56 is depicted in FIG. 6 and its position points 58 and 70 are depicted in relation to an obstacle 80 located at a position point $p_4$ which is identified by the reference numeral 86. Position point 86 has coordinates $x_4$, $y_4$ and $z_4$.

From position point 58, the distance vector to obstacle 80 is given by a distance vector $R_1$ identified by the reference numeral 82. From position point 70 the distance vector to obstacle 80 is given by a distance vector $R_2$ identified by the reference numeral 84. The distance vectors $R_1$ and $R_2$ are defined by the following equations:

$$R_1 = (x_4 - x_1)i + (y_4 - y_1)j + (z_4 - z_1)k \quad (7)$$

$$R_2 = (x_4 - x_2)i + (y_4 - y_2)j + (z_4 - z_2)k \quad (8)$$

The distances for distance vectors $R_1$ and $R_2$ are calculated in accordance with the following equations:

$$|R_1| = \sqrt{(x_4 - x_1)^2 + (y_4 - y_1)^2 + (z_4 - z_1)^2} \quad (9)$$

$$|R_2| = \sqrt{(x_4 - x_2)^2 + (y_4 - y_2)^2 + (z_4 - z_2)^2} \quad (10)$$

The distance and direction of object 56 in relation to obstacle 80 are calculated during each time sample. A time sample calculation generally occurs, for example, every millisecond while the skier 10 is traveling on path 11 towards tree 12. This provides adequate time for skier 10 to avoid the tree 12 or to activate the protection system 46.

The alignment of direction vector 74 is compared to the alignment of vectors 82 and 84 to determine whether object 56 is headed toward obstacle 80 during that time interval. Since a vector cross product provides a value zero for parallel vectors, collision decision processor 34 is able to determine whether object 56 will impact obstacle 80. The distance of object 56 from obstacles which have their locations stored in device 36 is continuously updated and then analyzed by collision decision processor 34 to determine whether object 56 will impact or avoid obstacle 80.

Analysis of a change in the direction vectors $\Delta_P$ for preceding time intervals relative to obstacle positions enables collision decision processor 34 to make accurate path prediction assessments for impending time intervals which enhances the ability of collision decision processor to predict whether object 56 will impact or avoid obstacle 80.

Collision decision processor 34 employs optimizing zalgorithms to reduce the number of obstacle calculations performed by collision decision processor 34 relative to the position and motion dynamics for object 56. The optimizing algorithms take into account distances to obstacles in the path of object 56, the speed of object 56 and the motion dynamics of object 56 relative to obstacles being analyzed in collision assessment calculations.

In an alternative embodiment, collision decision processor 34 produces warning signals in an escalating manner which depends on the proximity of object 56 to obstacles such as tree 12 (FIG. 1). As object 56 moves relative to obstacle in its path, collision decision algorithms in processor 34 produce variable state signals, such as soft or low audible tones for potential collision hazards where, for example the probability of collision is less than twenty percent, to load high pitch tones when a collision is highly likely to occur, for example, when there is at least a sixty percent probability that a collision will occur. Collision decision processor 34 also has false alarm rejection algorithms in its software to filter and mitigate false alarm states to avoid activation of warning and protection signals when these signals are not required.

In yet another embodiment, collision decision processor 34 includes adaptive motion prediction algorithms based upon the movement history for object 56, and the current position and motion dynamics of object 56 relative to obstacles 80 in its path which enhances the collision analysis performed by collision decision processor 34. To illustrate, an algorithm establishes decision criteria for warning or protection signal activation only when obstacles 80 are in a forward sector of the path that object 56 is traveling. An obstacle 80 that is at a right angle to object 56 or behind object 56 is rejected for collision assessment by collision decision processor 34. The decision criteria utilized by collision decision processor 34 in making the assessment includes the position history for object 56, its current speed and acceleration dynamics and its prior known movement capability.

The processing speeds of GPS processor 22, motion dynamics processor 26 and its computer circuitry 30 and collision decision processor 34 are very fast (in the order of a 100 milliseconds or less) to enable collision avoidance apparatus 16 to provide a warning signal to warning system 42 and if necessary a protection signal to protection system 46. To illustrate, a skier 10 moving at a constant speed of 30 miles per hour headed toward tree 12 at a separation distance of 100 feet will impact tree in about 2.27 seconds. With current state of the art microprocessor technology, there is more than adequate capability to process the position, speed, acceleration and motion dynamics data relating to skier 10 as he heads towards tree 12 and provide protection to skier 10 to avoid serious injury to skier 10.

With the current processing speeds available for GPS data processing devices and microprocessors, Δt in equations 3 and 6 approaches very small numerical values. This, in turn, results in the motion dynamics calculations approaching the equivalent of a calculus derivative that provides a measure of instantaneous velocity and acceleration. For this case equations 3 and 6 would take the differential form:

$$\frac{dP_{12}}{dt} = V_{12} = \frac{(x_2 - x_1)}{dt}i + \frac{(y_2 - y_1)}{dt}j + \frac{(z_2 - z_1)}{dt}k \quad (11)$$

$$A_{12} = \frac{V_{23} - V_{12}}{dt} = \frac{v_{23x} - v_{12x}}{dt}i + \frac{v_{23y} - v_{12y}}{dt}j + \frac{v_{23z} - v_{12z}}{dt}k \quad (12)$$

At this time, it should be noted that the GPS Collision avoidance apparatus comprising the present invention may be adapted for use with other portable devices such as commercially available GPS units, such as the GPS units installed in automobiles, or cell phones.

From the foregoing, it is readily apparent that the present invention comprises a new, unique and exceedingly useful GPS collision avoidance apparatus which constitutes a considerable improvement over the known prior art. Many modifications and variations are possible in light of the above teachings. It is therefore to be understood that within the scope of the appended claims that the invention may be practiced otherwise than as specifically described.

What is claimed is:

1. A GPS (Global Positioning System) collision avoidance apparatus comprising:
    (a) a GPS processor having a GPS receiving antenna, said GPS receiving antenna continuously receiving radio frequency carrier signals containing GPS data from an external source which generates said GPS data, said GPS processor processing said GPS data calculating current position data for said collision avoidance apparatus including a latitude, a longitude and an elevation for said collision avoidance apparatus;
    (b) a clock for providing time data;
    (c) a motion dynamics processor connected to said GPS processor and said clock, said motion dynamics processor including a computer having computer software for performing calculations on the current position data provided by said GPS processor and the time data provided by said clock to determine position and motion dynamics data for said collision avoidance apparatus, said position and motion dynamics data including current position, direction of motion, velocity and acceleration data for said collision avoidance apparatus and a user of said collision avoidance apparatus;
    (d) a stored obstacle locations device having digital memory for storing locations for stationary obstacles, which are in a path of said user of said collision avoidance apparatus, said stored obstacle locations device providing location data indicative of the locations of said stationary obstacles including man made and natural occurring obstacles in the path said user is traveling;
    (e) a collision decision processor connected to said motion dynamics processor and said stored obstacle locations device, said collision decision processor comparing said location data for said stationary obstacles in the path of said user with said current position, direction of motion, velocity and acceleration data for said user of said collision avoidance apparatus, said collision decision processor determining a distance between said user of said collision avoidance apparatus and a closest one of said stationary obstacles in the path of said user and then calculates a probability for a collision between said user and the closest one of said stationary obstacles in the path of said user; and
    (f) a collision protection system connected to said collision decision processor, said collision decision processor sending said collision protection system an activation signal whenever said collision decision processor calculates that there is insufficient time to avert said collision between said user and the closest one of said stationary obstacles in the path of said user, said collision protection system, responsive to said activation signal, activating a protection device to prevent serious bodily harm to said user.

2. The GPS collision avoidance apparatus of claim 1 further comprising a collision warning system connected to said collision decision processor, said collision decision processor sending a collision warning signal to said collision warning system whenever said collision decision processor determines that there is an impending collision between said user and the closest one of said stationary obstacles in the path of said user, said collision warning system, responsive to said collision warning signal providing an audio signal to said user indicating said impending collision allowing said user to take evasive action to avoid the closest one of said stationary obstacles in the path of said user.

3. The GPS collision avoidance apparatus of claim 2 wherein said audio signal consist of low audible tones when the probability of said collision occurring between said user and the closest one of said stationary obstacles in the path of said user is less than twenty percent.

4. The GPS collision avoidance apparatus of claim 2 wherein said audio signal consist of high pitch audible tones when the probability of said collision occurring between said user and the closest one of said stationary obstacles in the path of said user is at least sixty percent.

5. The GPS collision avoidance apparatus of claim 1 further comprising a collision warning system connected to said collision decision processor, said collision decision processor sending a collision warning signal to said collision warning system whenever said collision decision processor determines that there is an impending collision between said user and the closest one of said stationary obstacles in the path of said user, said collision warning system, responsive to said collision warning signal providing visual representation of said impending collision to said user allowing said user to take evasive action to avoid the closest one of said stationary obstacles in the path of said user.

6. The GPS collision avoidance apparatus of claim 1 wherein said insufficient time to avert collision between said user and the closest one of said stationary obstacles in the path of said user is from two to ten seconds.

7. The GPS collision avoidance system of claim 1 wherein said digital memory in said stored obstacle locations device comprises an electrically erasable programmable read-only memory.

8. A GPS (Global Positioning System) collision avoidance apparatus comprising:

(a) a GPS processor having a GPS receiving antenna, said GPS receiving antenna continuously receiving radio frequency carrier signals containing GPS data from an external source which generates said GPS data, said GPS processor processing said GPS data calculating current position data for said collision avoidance apparatus including a latitude, a longitude and an elevation for said collision avoidance apparatus;

(b) a clock for providing time data;

(c) a motion dynamics processor connected to said GPS processor and said clock, said motion dynamics processor including a computer having computer software for performing calculations on the current position data provided by said GPS processor and the time data provided by said clock to determine position and motion dynamics data for said collision avoidance apparatus, said position and motion dynamics data including current position, direction of motion, velocity and acceleration data for said collision avoidance apparatus and a user of said collision avoidance apparatus;

(d) a stored obstacle locations device having digital memory for storing locations for stationary obstacles, which are in a path of said user of said collision avoidance apparatus, said stored obstacle locations device providing location data indicative of the locations of said stationary obstacles including man made and natural occurring obstacles in the path said user is traveling; and (e) a collision decision processor connected to said motion dynamics processor and said stored obstacle locations device, said collision decision processor comparing said location data for said stationary obstacles in the path of said user with said current position, direction of motion, velocity and acceleration data for said user of said collision avoidance apparatus, said collision decision processor determining a distance between said user of said collision avoidance apparatus and a closest one of said stationary obstacles in the path of said user and then calculates a probability for a collision between said user and the closest one of said stationary obstacles in the path of said user;

(f) a collision warning system connected to said collision decision processor, said collision decision processor sending a collision warning signal to said collision warning system whenever said collision decision processor determines that there is an impending collision between said user and the closest one of said stationary obstacles in the path of said user, said collision warning system, responsive to said collision warning signal providing an audio signal to said user indicating said impending collision allowing said user to take evasive action to avoid the closest one of said stationary obstacles in the path of said user; and (g) a collision protection system connected to said collision decision processor, said collision decision processor sending said collision protection system an activation signal whenever said collision decision processor calculates that there is insufficient time to avert said collision between said user and the closest one of said stationary obstacles in the path of said user, said collision protection system, responsive to said activation signal, activating a protection device to prevent serious bodily harm to said user.

9. The GPS collision avoidance apparatus of claim 8 wherein said audio signal consist of low audible tones when the probability of said collision occurring between said user and the closest one of said stationary obstacles in the path of said user is less than twenty percent.

10. The GPS collision avoidance apparatus of claim 8 wherein said audio signal consist of high pitch audible tones when the probability of said collision occurring between said user and the closest one of said stationary obstacles in the path of said user is at least sixty percent.

11. The GPS collision avoidance apparatus of claim 8 wherein said insufficient time to avert said collision between said user and the closest one of said stationary obstacles in the path of said user is from two to ten seconds.

12. The GPS collision avoidance apparatus of claim 8 wherein said digital memory in said stored obstacle locations device comprises an electrically erasable programmable read-only memory.

13. The GPS collision avoidance apparatus of claim 8 wherein said direction of motion for said collision avoidance apparatus and said user of said collision avoidance apparatus as determined by said motion dynamics processor is given by the following expression:

$$\Delta P_{12} = P_2 - P_1 = (x_2-x_1)i + (y_2-y_1)j + (z_2-z_1)k$$

where $\Delta P_{12}$ is a direction vector defining said direction of motion, and $P_2$ and $P_1$ are position points representing two consecutive positions for said collision avoidance apparatus and said user that are currently being sampled by said GPS processor.

14. The GPS collision avoidance apparatus of claim 13 wherein said velocity for said collision avoidance apparatus and said user of said collision avoidance apparatus as determined by said motion dynamics processor is given by the following expression:

$$V_{12} = \frac{\Delta P_{12}}{\Delta t} = \frac{(x_2-x_1)}{\Delta t}i + \frac{(y_2-y_1)}{\Delta t}j + \frac{(z_2-z_1)}{\Delta t}k$$

where $V_{12}$ is said velocity for said collision avoidance apparatus and said user, $\Delta P_{12}$ is said direction vector, and $\Delta t$ is a time interval for travel by said collision avoidance apparatus and said user between said position points $P_2$ and $P_1$.

15. The GPS collision avoidance apparatus of claim 14 wherein said acceleration for said collision avoidance apparatus and said user of said collision avoidance apparatus as determined by said motion dynamics processor is given by the following expression:

$$A_{12} = \frac{V_{23}-V_{12}}{\Delta t} = \frac{v_{23x}-v_{12x}}{\Delta t}i + \frac{v_{23y}-v_{12y}}{\Delta t}j + \frac{v_{23z}-v_{12z}}{\Delta t}k \quad (6)$$

where $A_{12}$ is said acceleration for said collision avoidance apparatus and said user, between a first velocity interval $V_{23}$ and said second velocity interval $V_{12}$.

* * * * *